United States Patent
Brummett et al.

(10) Patent No.: US 7,150,159 B1
(45) Date of Patent: Dec. 19, 2006

(54) HYBRID AUXILIARY POWER UNIT FOR TRUCK

(75) Inventors: Keiv Brummett, Atoka, OK (US); Bobby L. Pannell, Copper Canyon, TX (US)

(73) Assignee: SCS Frigette, Fort Worth, TX (US)

( * ) Notice: Subject to any disclaimer, the term of this patent is extended or adjusted under 35 U.S.C. 154(b) by 76 days.

(21) Appl. No.: 10/954,055

(22) Filed: Sep. 29, 2004

(51) Int. Cl.
 *B60H 1/32* (2006.01)
(52) U.S. Cl. ............................. 62/236; 62/239
(58) Field of Classification Search ................. 62/236, 62/239–244
 See application file for complete search history.

(56) References Cited

U.S. PATENT DOCUMENTS

| | | | |
|---|---|---|---|
| 3,699,870 A | 10/1972 | Cantagallo et al. | |
| 3,866,433 A * | 2/1975 | Krug | 62/229 |
| 3,984,224 A * | 10/1976 | Dawkins | 62/89 |
| 4,051,691 A * | 10/1977 | Dawkins | 62/236 |
| 4,280,330 A * | 7/1981 | Harris et al. | 62/3.3 |
| 4,448,157 A | 5/1984 | Eckstein et al. | |
| 4,531,379 A * | 7/1985 | Diefenthaler, Jr. | 62/236 |
| 4,611,466 A | 9/1986 | Keedy | |
| 4,748,824 A | 6/1988 | Wakabayashi et al. | |
| 4,762,170 A | 8/1988 | Nijjar et al. | |
| 4,825,663 A * | 5/1989 | Nijjar et al. | 62/236 |
| 5,020,320 A | 6/1991 | Talbert et al. | |
| 5,105,096 A * | 4/1992 | Waldschmidt et al. | 307/68 |
| 5,253,700 A | 10/1993 | Early, Jr. | |
| 5,319,944 A | 6/1994 | Uehara | |
| 5,333,678 A | 8/1994 | Mellum et al. | |
| 5,528,901 A | 6/1996 | Willis | |
| 5,765,805 A | 6/1998 | Kennedy | |
| 6,047,942 A | 4/2000 | Kennedy | |
| 6,059,058 A * | 5/2000 | Dower | 180/65.3 |
| 6,677,684 B1 | 1/2004 | Kennedy | |
| 6,681,588 B1 | 1/2004 | Zeigler | |
| 6,756,693 B1 | 6/2004 | Kennedy | |
| 6,932,148 B1 * | 8/2005 | Brummett et al. | 165/43 |
| 7,034,410 B1 | 4/2006 | Kennedy | |
| 2002/0056993 A1 | 5/2002 | Kennedy | |
| 2003/0034147 A1 | 2/2003 | Houck et al. | |
| 2003/0070849 A1 | 4/2003 | Whittaker | |
| 2003/0141049 A1 | 7/2003 | Kennedy | |
| 2004/0145185 A1 | 7/2004 | Kennedy | |

* cited by examiner

*Primary Examiner*—William E. Tapolcai
(74) *Attorney, Agent, or Firm*—Bracewell & Giuliani LLP

(57) ABSTRACT

A hybrid auxiliary power system for a vehicle provides auxiliary electrical power, cooling, and heating while the main engine of the vehicle is turned off. An auxiliary engine directly drives an air-conditioner compressor. A condenser condenses the refrigerant and supplies it to an evaporator. A blower moves air through the evaporator and into the vehicle. The engine also drives an AC generator, which supplies air to a battery charger. The battery charger supplies DC voltage to charge the battery of the vehicle as well as power to the blower of the auxiliary air-conditioner.

15 Claims, 3 Drawing Sheets

HYBRID AUXILIARY POWER UNIT FOR TRUCK

FIELD OF THE INVENTION

This invention relates in general to heating and cooling systems for vehicles, and in particular to an auxiliary system utilizing an engine, a generator, and heating and cooling elements.

BACKGROUND OF THE INVENTION

Large tractor trucks typically have air-conditioning systems similar to automobiles. The truck engine drives a compressor that compresses refrigerant and delivers it to a condenser. The condenser converts the hot gaseous refrigerant to a liquid refrigerant. The liquid refrigerant flows to an evaporator where it undergoes a pressure drop, converting the liquid refrigerant to a cold gas. An interior blower moves air through the evaporator and into the interior of the vehicle. The condenser is cooled by the main engine fan, which also flows air through the engine radiator.

For heating, a heater coil or element is mounted in the vehicle in communication with the radiator via hoses. A portion of the hot engine coolant flows through the heater element. The interior blower moves air through the heater coil to heat the interior of the vehicle.

Many large trucks have sleeper compartments attached to or part of the cab for allowing the driver to rest. Often, the truck will have a rear unit for heating and cooling the sleeper compartment. The rear unit comprises an evaporator in parallel with the cab evaporator, and a heater element in parallel with the cab heater element. The rear unit uses the same compressor and condenser as the cab unit. In order for the rear heating and cooling system to operate, the operator must run the main truck engine. Often while operating the rear heating and cooling system, the truck is parked. The main engine generates far more power at idle than is needed for operating the rear heating and cooling system, resulting in a waste of fuel.

One approach for heating and cooling a sleeper compartment while the truck is parked is to utilize a 110 volt air conditioning unit to the truck. Some rest stops have service receptacles that enable the operator to connect a power cord to the 110 volt air conditioning unit. Many rest stops, however, do not have such provisions for connecting a vehicle to AC (alternating current) electrical power.

Also, in the prior art, generators have been mounted to large trucks for generating 110–115 volt AC power. An auxiliary engine, normally diesel, is located in a compartment along with an AC generator. The generator powers a 110 volt air conditioning unit mounted to the sleeper compartment. The air conditioning unit has an AC electrical motor that drives the compressor and the fan. For heat, an electrical resistance element is employed. These systems are normally referred to as "gen-sets".

Another prior art approach, sometimes referred to as an "auxiliary power unit", utilizes an auxiliary engine in an external compartment to directly drive a motor vehicle type compressor. A condenser and radiator are located in the external compartment. An evaporator, heater element, and DC (direct current) blower are mounted within the sleeper compartment. The compressor delivers refrigerant to the condenser, which in turn delivers condensed refrigerant to the evaporator for cooling the interior of the truck. For heating, a portion of the coolant from the auxiliary engine may be diverted from the radiator to the heater element. In one such system, when the heater is turned on, a valve assembly proportionately reduces the coolant flowing to the auxiliary radiator while increasing the coolant flowing to the heater element.

The prior art auxiliary power unit does not have a generator, rather has an alternator that supplies DC (direct current) voltage. The DC voltage powers the blower for the evaporator and heater element and drives the fan for the condenser and radiator. The alternator of the auxiliary unit also charges the main truck batteries. This type of unit may also have an inverter that converts part of the DC voltage from the auxiliary engine alternator into AC voltage for running AC appliances in the sleeper compartment.

SUMMARY OF THE INVENTION

In this invention, an auxiliary unit is provided that has an AC generator and an engine driven air conditioning compressor, thus it may be considered to be a hybrid of a gen-set and an auxiliary power unit. An external compartment houses an auxiliary engine and the AC generator. The generator supplies AC power to the vehicle and also to a battery charger. The battery charger converts the AC voltage to DC voltage for charging the batteries of the vehicle.

The air-conditioner compressor is mounted to and directly driven by the auxiliary engine for compressing refrigerant. The hybrid system has a condenser, evaporator and a blower. The blower for the evaporator is electrically driven by power supplied by the AC generator. Preferably the blower operates on DC voltage that has been converted by the battery charger. In the preferred embodiment, the auxiliary engine does not have an auxiliary alternator. Rather all of the auxiliary electrical power is supplied by the AC generator.

In the preferred embodiment, the auxiliary engine is water-cooled by a radiator. A fan moves air through the radiator and the condenser. The fan preferably has a DC motor that is also supplied power from the converted AC voltage generated by the AC generator. Preferably, the battery charger also supplies DC voltage to operate a fuel pump, a water pump, and an oil pump.

DETAILED DESCRIPTION OF THE INVENTION

Figure 1:
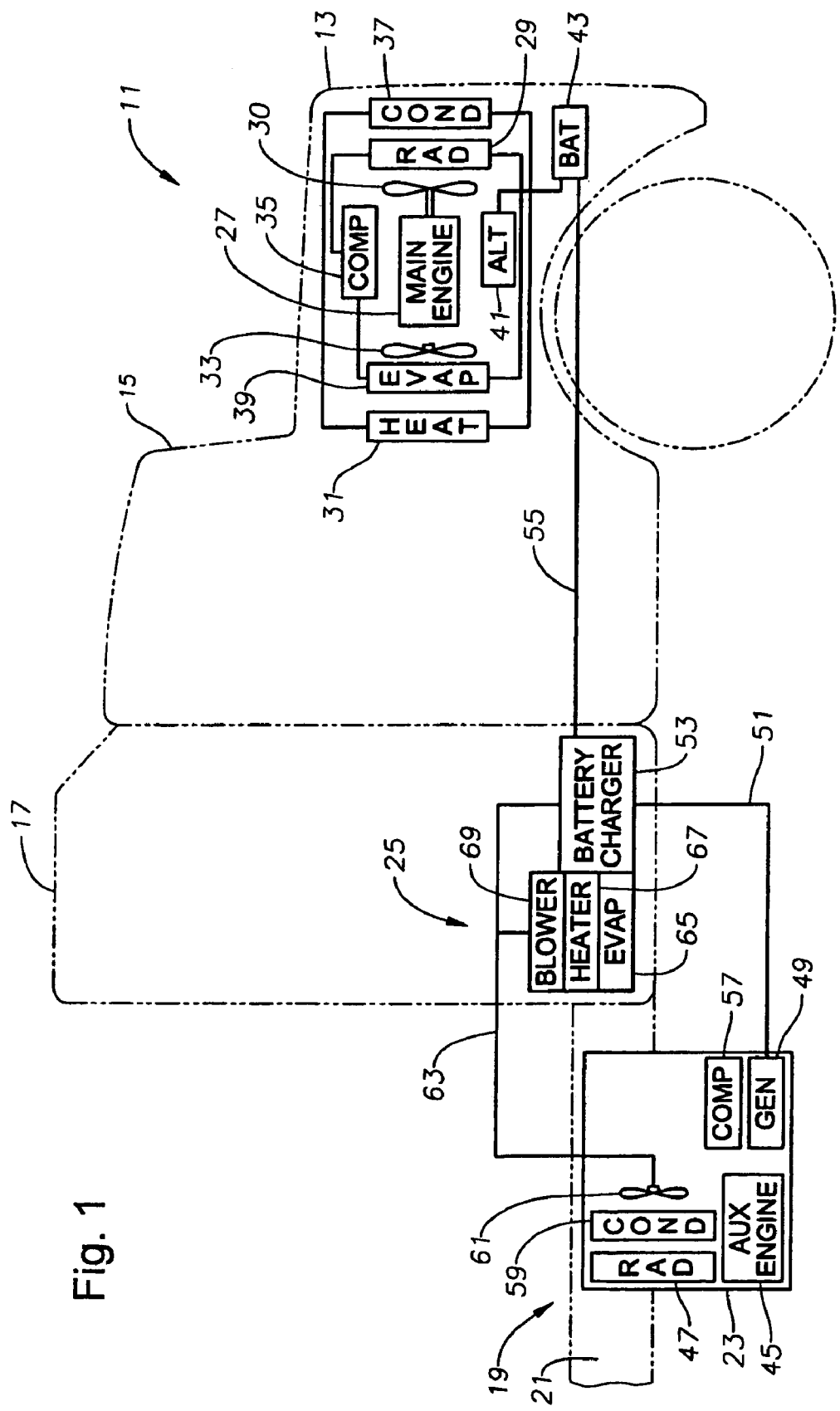
FIG. 1 is a schematic elevational view of a truck having an auxiliary power system in accordance with this invention.

Referring to FIG. 1, truck 11 has an engine compartment 13, a cab 15 and optionally a sleeping compartment 17. The interior of sleeping compartment 17 may be in common with the interior of cab 15.

A hybrid auxiliary power unit 19 is mounted to frame 21 of truck 11. Hybrid power unit 19 may be located in various positions on truck 11, and is typically rearward of sleeping compartment 17. Hybrid power unit 19 is located within a housing or exterior compartment 23. An auxiliary evaporator and heater unit 25 is preferably located separate from compartment 23. In this embodiment, evaporator and heater unit 25 is located within sleeper compartment 17, preferably on the floor under the bed or bunk.

Truck 11 is conventional, having a primary engine 27, normally diesel, that propels truck 11. Hoses connect a main radiator 29 to main engine 27 for receiving engine coolant. An engine fan 30 is directly driven by main engine 27 for causing air flow through main radiator 29. Truck 11 also has a main interior heater element or coil 31 and a main interior blower 33. Heater element 31 is connected by hoses to radiator 29 for receiving a portion of the flow of engine coolant. Blower 33 moves air through heater element 31 for heating the interior of cab 15. Valves (not shown) controlled by the driver will selectively provide or stop the flow of engine coolant through heater 31.

For cooling, engine 27 drives a main compressor 35 by a belt (not shown). Compressor 35 delivers hot gaseous refrigerant to a main condenser 37 that is mounted parallel to radiator 29. Condenser 37 condenses the refrigerant to a liquid, which flows to a main evaporator 39. Typically, the same interior blower 33 moves air through evaporator 39 into the interior of cab 15.

Often, sleeper compartment 17 will have a rear evaporator, heater element, and blower (not shown) for heating and cooling sleeper compartment 17. If so, main compressor 35 and main condenser 37 supply refrigerant to the rear evaporator. Main engine 27 and radiator 29 would supply coolant to the rear heater element for heating. Main engine 27 also has a main alternator 41 driven by a belt. Alternator 41 supplies DC electrical power for blower 33 and other uses. Alternator 41 also charges battery or a set of batteries 43.

Auxiliary engine 45 is a small, water-cooled diesel engine in the preferred embodiment. Auxiliary engine 45 has fluid lines connected to a radiator 47 that is also mounted in compartment 23. Auxiliary engine 45 drives an alternating current generator 49 that supplies 115 volts of AC voltage. The capacity of generator 49 may vary and in one example it provides about 3480 watts. Generator 49 is connected by wires 51 to a battery charger 53 for converting some of the AC voltage to DC voltage. Battery charger 53 is of a conventional type of DC converter, such as one having about 40 amps of capacity. Battery charger 53 is preferably mounted in the interior of sleeping compartment 17, such as below the bed or bunk (not shown). Battery charger 53 is connected by wires 55 to the main truck battery 43 for maintaining battery 43 in full charge while hybrid auxiliary power unit 19 is operating. AC generator 49 is also connected to one or more AC outlets in sleeper compartment 17 for powering AC appliances.

An auxiliary compressor 57 is mounted to and driven by auxiliary engine 45. Auxiliary compressor 57 is a conventional motor vehicle air conditioner compressor. Auxiliary compressor 57 is connected by a hose to an auxiliary condenser 59, which is also located in exterior compartment 23. Auxiliary condenser 59 is preferably located parallel to and upstream from radiator 47. A single fan 61 moves air through condenser 59 and radiator 47. Fan 61 is powered by AC generator 49, but preferably has a DC motor connected by a wire 63 to a DC output of battery charger 53. Alternately, fan 61 could have an AC motor.

Evaporator and heater unit 25 is also preferably located under the bunk or bed within compartment 17, but it could be mounted to the exterior back wall of sleeping compartment 17. Evaporator and heater unit 25 includes an evaporator 65 that receives condensed refrigerant from condenser 59. A heater element 67 is mounted next to evaporator 65. Heater element 67 could be of a type that utilizes electrical resistance, but preferably is one that is connected to auxiliary radiator 47 for circulating coolant. A single blower 69 moves air through evaporator 65 and heater element 67. Blower 69 preferably has a DC motor connected to the DC output of battery charger 53, but it alternately could have an AC motor.

Figure 2:
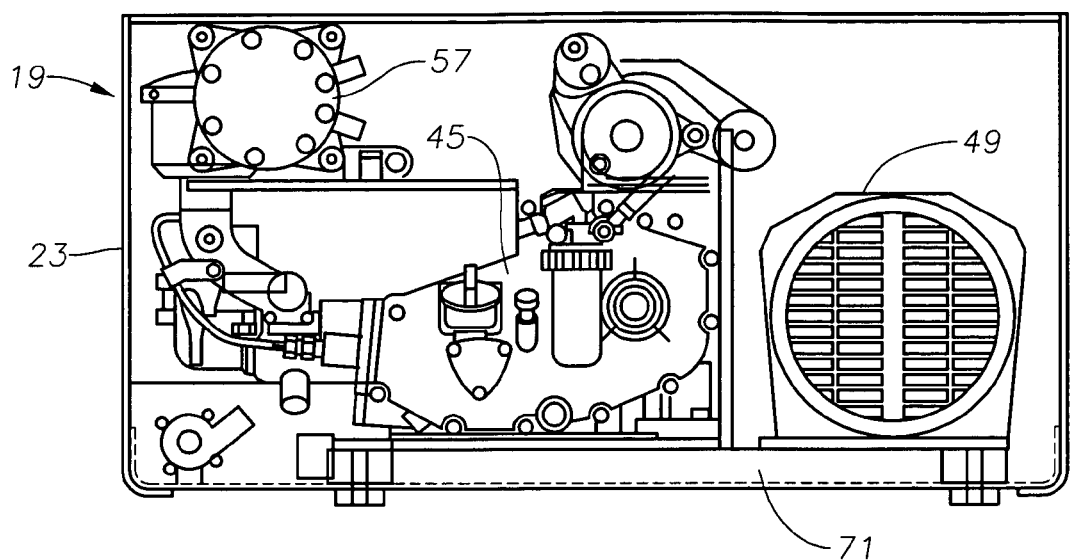
FIG. 2 is a side elevational view of the engine and generator of the auxiliary power system of FIG. 1.
Figure 3:
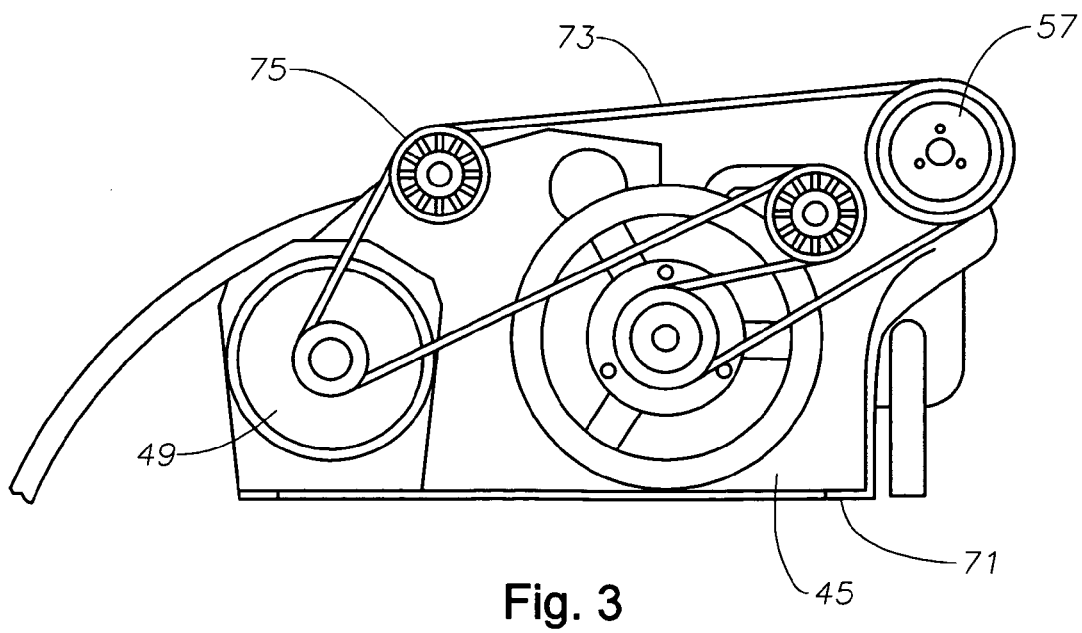
FIG. 3 is a side elevational view of the opposite side of the auxiliary engine and generator of FIG. 2.

Referring to FIGS. 2 and 3, in this embodiment, auxiliary engine 45 and generator 49 are mounted next to each other on a common support frame 71. Preferably, a single belt 73 extends from the output shaft of auxiliary engine 45 around drive pulleys on generator 49 and compressor 57. A tensioning pulley 75 may be adjusted to provide the desired amount of tension to belt 73. Because of AC generator 49 and battery charger 53 (FIG. 1), hybrid auxiliary power unit 19 does not need an alternator.

Figure 4:
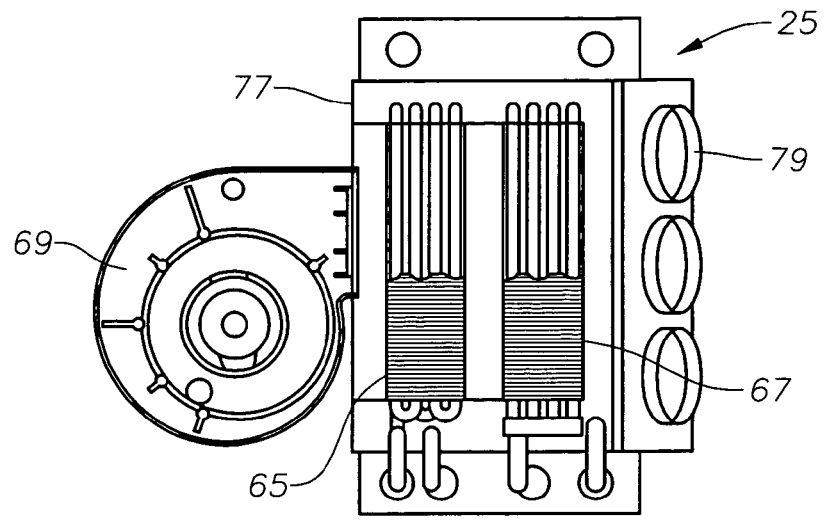
FIG. 4 is a partially sectional view of the air-conditioning and heating unit of the auxiliary power system of FIG. 1.

Referring to FIG. 4, evaporator and heater unit 25 includes a housing 77 that houses evaporator 65 and heater element 67. Blower 69 mounts to housing 77. Housing 77 has outlet ports 79 for discharging air heated or cooled by evaporator 65 or heater element 67. Outlet ports 79 preferably connect to ducts (not shown) that lead to registers placed at desired points within sleeping compartment 17 (FIG. 1).

Figure 5:
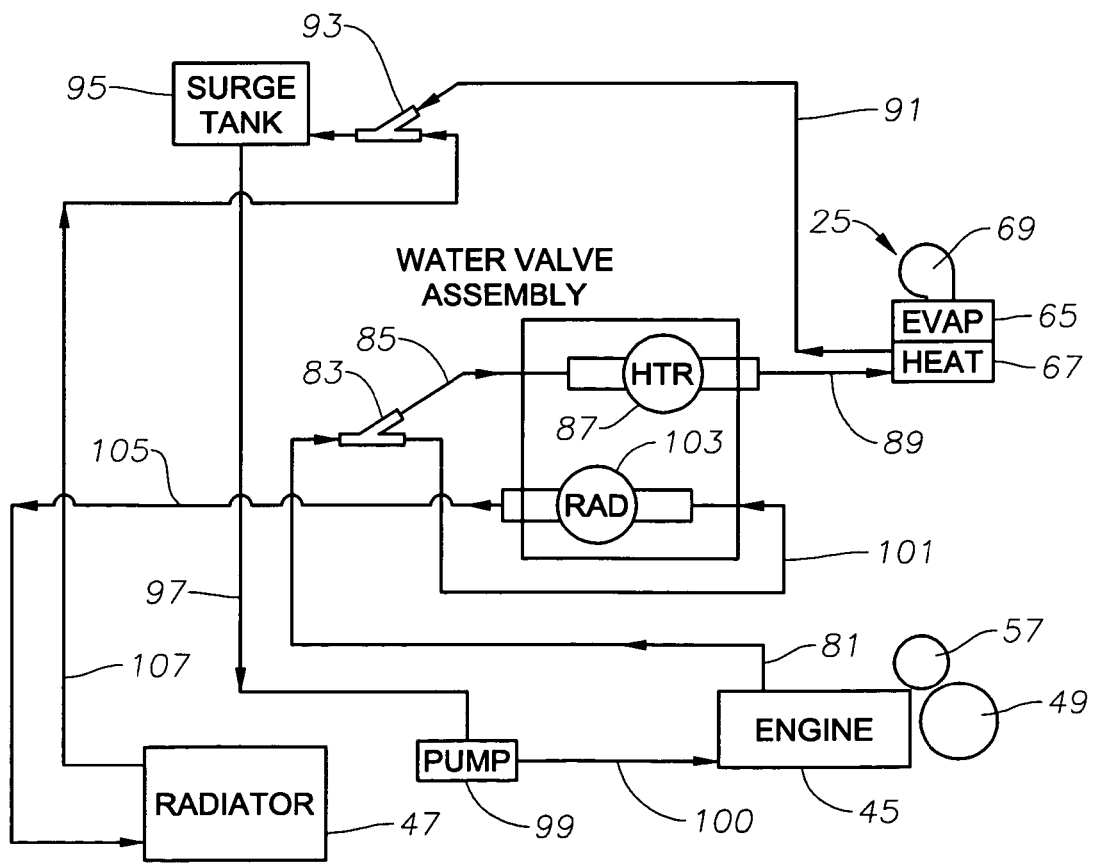
FIG. 5 is a schematic view of the coolant fluid flow for the auxiliary system of FIG. 1.

FIG. 5 illustrates a preferred embodiment of coolant flow for auxiliary engine 45. Auxiliary engine 45 has a coolant line 81 that leads to a Y-junction 83. A coolant line 85 leads from one branch of Y-junction 83 to a heater valve 87. Heater valve 87 moves between a fully closed and a fully open position, providing a selected coolant flow rate through a coolant line 89 to auxiliary heater element 67. A coolant line 91 leads from heater element 67 to one branch of a Y-junction 93. The single output of Y-junction 93 leads to a surge tank 95. A line 97 connects surge tank 95 to a pump 99, which is preferably driven by a DC motor. In this embodiment, auxiliary engine 45 has a DC fuel pump (not shown) and a DC lubricant pump (not shown) that circulates lubricating oil from an external reservoir to a sump of auxiliary engine 45. Coolant pump 99 and the fuel and lubricant pumps are also powered by battery charger 53 (FIG. 1).

The second branch of the first Y-junction 83 connects to a line 101 that leads to radiator valve 103. Radiator valve 103 will operate between a completely closed and a completely open position for varying the flow rate of coolant flowing out line 105 to auxiliary radiator 47 from zero to maximum. A linkage (not shown) preferably causes valves 87, 103 to operate in conjunction but opposite to each other. That is, as heater valve 87 opens a selected increment, radiator valve 103 closes the same amount. A line 107 connects the outlet of auxiliary radiator 47 to the other branch of Y-junction 93. The flow from radiator 47 in line 107 thus commingles with the flow, if any, from heater element 67. In the preferred embodiment, all of the coolant flow lines 81, 85, 89, 91, 97, 100, 101, 105, and 107 are of the same diameter.

In operation, referring to FIG. 1, while main engine 27 is operating, there is no need to operate auxiliary power unit 19. Main engine 27 supplies sufficient power for heating and cooling while it is in operation. When truck 11 has stopped for an extended period, the operator may stop engine 27 and turn on auxiliary engine 45. Battery 43 provides voltage to a starter (not shown) of auxiliary engine 45.

Auxiliary engine 45 drives generator 49 to generate 115 AC volt power. Generator 49 provides power to battery charger 53, which converts the AC voltage supplied to it to a DC voltage. Battery charger 53 supplies charging voltage via wires 55 to battery 43. Some of the AC voltage will also be supplied through outlets in the interior of sleeping compartment 17 for AC appliances.

If cooling is needed, a clutch (not shown) for auxiliary compressor 57 will engage compressor 57, causing it to supply pressurized refrigerant to condenser 59. Condenser 59 delivers condensed refrigerant to evaporator 65. A pressure drop causes the refrigerant to expand, and blower 69 moves air across evaporator 65 into the interior of sleeping compartment 17. The refrigerant returns from evaporator 65 to compressor 57.

If heat is needed in compartment 17, compressor 57 is disengaged. Referring to FIG. 5, valves 87, 103 proportionately open and close to direct some of the coolant to heater element 67. The same amount of flow to auxiliary radiator 47 is reduced by valve 103. Valves 87, 103 operate in conjunction with each other and are controlled by a thermostat (not shown). Referring again to FIG. 1, blower 69 causes air movement through heater element 67 into the interior of sleeper compartment 17.

The invention has significant advantages. By using an engine driven compressor, a conventional automotive compressor, blower and evaporator may be used, which typically do not cost as much as an AC air conditioning system. There is no need for an additional electric motor to drive the compressor as in the case of prior art gen-sets. By utilizing a generator, rather than an alternator, AC power is available for accessories in the truck, avoiding the need for an inverter. The battery charger powered by the generator maintains not only the truck batteries but supplies the DC voltage required for various pumps and fans.

While the invention has been shown in only one of its forms, it should be apparent to those skilled in the art that it is not so limited but is susceptible to various changes without departing from the scope of the invention.

We claim:

1. A vehicle having a main engine, a main radiator, and a main air conditioning and heating system having at least one main heater element connected to the main radiator by main coolant lines for heating the interior of the vehicle while the main engine is operating, an improved system for heating and cooling the interior of the vehicle while the main engine of the vehicle is not operating, comprising:

an auxiliary engine;

an auxiliary radiator in fluid communication with the auxiliary engine;

an AC generator mounted to and driven by the auxiliary engine for generating AC voltage;

a battery charger electrically connected with the AC generator for converting the AC voltage into DC voltage and supplying the DC voltage to a battery of the vehicle;

an auxiliary air conditioning and heating assembly that is operable independently of any component of the main air conditioning and heating system and which comprises:

an auxiliary heater element connected to the auxiliary radiator by auxiliary coolant lines for receiving coolant flowing from the auxiliary engine, the auxiliary coolant lines being isolated from the main coolant lines, so that only coolant from the auxiliary engine flows through the auxiliary heater element and not coolant from the main engine;

an air conditioner auxiliary compressor mounted to and driven by the auxiliary engine for compressing refrigerant;

an auxiliary condenser in fluid communication with the auxiliary compressor for condensing the refrigerant supplied by the auxiliary compressor;

an auxiliary evaporator in fluid communication with the refrigerant condensed by the auxiliary condenser; and an electrically driven blower mounted adjacent the auxiliary evaporator for moving air through the auxiliary evaporator and into the interior of the vehicle.

2. The vehicle according to claim 1, wherein the blower is driven by the DC voltage supplied from the battery charger.

3. The vehicle according to claim 1, further comprising:

a fan adjacent the auxiliary radiator for moving air through the auxiliary radiator and the auxiliary condenser, the fan being powered by the DC voltage supplied from the battery charger.

4. In a vehicle having a main engine, a battery, a main air conditioning and heating system powered by the main engine for heating and cooling an interior of a vehicle including a main radiator connected to at least one main heater element by main coolant lines for providing heating, and at least one main evaporator for providing cooling, an auxiliary air conditioning and heating system for heating and cooling the interior of the vehicle while the main engine of the vehicle is not operating, comprising:

an auxiliary engine;

an air conditioner compressor mounted to and driven by the auxiliary engine for compressing refrigerant;

a condenser in fluid communication with the compressor for condensing the refrigerant;

an auxiliary evaporator in fluid communication with the refrigerant condensed by the condenser;

an auxiliary heater element mounted adjacent to the auxiliary evaporator;

an auxiliary blower mounted adjacent to the auxiliary evaporator and the auxiliary heater element for moving air through the auxiliary evaporator and the auxiliary heater element into the interior of the vehicle to selectively cool and heat the interior of the vehicle, the auxiliary blower being isolated from the main heater and the main evaporator so as to not move air through the main evaporator while moving air through the auxiliary evaporator and the auxiliary heater element;

an auxiliary radiator adjacent to the condenser and in fluid communication with coolant of the auxiliary engine and with the auxiliary heater element via auxiliary coolant lines that are isolated from the main coolant lines for circulating coolant from the auxiliary engine only through the auxiliary radiator and the auxiliary heater element;

a fan for moving air through the condenser and the radiator;

an AC generator mounted to and driven by the auxiliary engine; and a battery charger electrically connected with the AC generator for supplying a DC voltage to charge the battery.

5. The vehicle according to claim 4, wherein the vehicle further comprises:

a coolant valve in one of the auxiliary coolant lines between the auxiliary engine, the auxiliary radiator and the auxiliary heater element, for proportionally varying an amount of coolant flowing from the auxiliary engine to the auxiliary radiator by the same amount of coolant flowing from the auxiliary engine to the auxiliary heater element.

6. The vehicle according to claim 4, wherein the auxiliary evaporator and the auxiliary heater element are mounted together in a housing, and the auxiliary blower is mounted to the housing, and the housing and the auxiliary blower are located within the interior of the vehicle separate from any components of the main air conditioning and heating system.

7. The vehicle according to claim 4, wherein the battery charger is located within the interior of the vehicle.

8. The vehicle according to claim 4, wherein the fan and the auxiliary blower are driven by DC voltage supplied by the battery charger.

9. A method of cooling an interior of a vehicle while a main engine of the vehicle is off, the vehicle having a main air conditioning and heating system having a main compressor driven by the main engine that circulates refrigerant through at least one main evaporator for cooling the interior of the vehicle while the main engine is running, and a main heater element for receiving coolant via main coolant lines from the main engine for heating the vehicle while the main engine is running, comprising:
 (a) providing the vehicle with an auxiliary engine, an auxiliary radiator, an AC generator, and an auxiliary air conditioning and heating system that is independently operable from the main air conditioning and heating system, the auxiliary air conditioning and heating system having an auxiliary compressor mounted to the auxiliary engine, an auxiliary condenser, a auxiliary condenser fan, an auxiliary evaporator, an auxiliary heater element connected to the auxiliary radiator via auxiliary coolant lines that are isolated from the main coolant lines, and an auxiliary blower;
 (b) operating the auxiliary engine and the AC generator, converting a portion of the AC voltage to DC voltage, and charging a main battery of the vehicle with the DC voltage;
 (c) for cooling, compressing refrigerant with the auxiliary compressor, moving air through the auxiliary condenser with the auxiliary fan, and condensing the compressed refrigerant with the auxiliary condenser;
 (d) flowing the condensed refrigerant through the auxiliary evaporator and moving air through the auxiliary evaporator into the interior of the vehicle with the auxiliary blower; and
 (e) for heating, circulating coolant through the auxiliary heater element via the auxiliary coolant lines, and moving air through the auxiliary heater element into the vehicle with the auxiliary blower.

10. The method according to claim 9, wherein the step of moving air through the condenser with the fan comprises supplying DC voltage to the fan.

11. The method according to claim 9, wherein the step of moving air through the auxiliary evaporator with the auxiliary blower comprises supplying DC voltage to the auxiliary blower.

12. The method according to claim 9, wherein step (b) comprises mounting the auxiliary evaporator and the auxiliary blower in the interior of the vehicle.

13. The method according to claim 9, wherein in step (e), the auxiliary blower moves air through the auxiliary evaporator, but not through the main evaporator.

14. The vehicle according to claim 1, wherein the auxiliary evaporator and the auxiliary heater element are located in an air flow path that is separate from any air flow path of any component of the main air conditioning system.

15. The vehicle according to claim 1, further comprising:
 a housing containing the auxiliary evaporator and the auxiliary heater element but no component of the main air conditioning and heating system; and wherein
 the blower is mounted to the housing, and the housing is mounted within the vehicle.

* * * * *